(12) United States Patent
Hermens

(10) Patent No.: US 7,724,344 B2
(45) Date of Patent: May 25, 2010

(54) METHOD AND SYSTEM FOR A LIQUID CRYSTAL DISPLAY

(75) Inventor: Harrie Hermens, Doenrade (NL)

(73) Assignee: TPO Displays Corp., Chu-Nan (TW)

( * ) Notice: Subject to any disclaimer, the term of this patent is extended or adjusted under 35 U.S.C. 154(b) by 157 days.

(21) Appl. No.: 11/837,860

(22) Filed: Aug. 13, 2007

(65) Prior Publication Data

US 2009/0046237 A1  Feb. 19, 2009

(51) Int. Cl.
G02F 1/1339 (2006.01)
(52) U.S. Cl. .................. 349/155; 349/156; 349/157
(58) Field of Classification Search .................. None
See application file for complete search history.

(56) References Cited

U.S. PATENT DOCUMENTS

| | | | | |
|---|---|---|---|---|
| 5,946,069 | A * | 8/1999 | Toko | 349/155 |
| 6,064,461 | A * | 5/2000 | Nishida | 349/155 |
| 6,299,949 | B1 * | 10/2001 | Shioda et al. | 428/1.5 |
| 6,452,659 | B1 * | 9/2002 | Akiyama et al. | 349/148 |
| 6,639,644 | B1 * | 10/2003 | Tateno et al. | 349/155 |
| 2001/0026347 | A1 * | 10/2001 | Sawasaki et al. | 349/156 |
| 2003/0206264 | A1 * | 11/2003 | Yoshimura et al. | 349/155 |
| 2007/0076161 | A1 * | 4/2007 | Morii | 349/155 |
| 2007/0146618 | A1 * | 6/2007 | Hashimoto | 349/155 |
| 2008/0036944 | A1 * | 2/2008 | Morii | 349/84 |
| 2009/0033860 | A1 * | 2/2009 | Tawaraya et al. | 349/155 |
| 2009/0059146 | A1 * | 3/2009 | Morii | 349/123 |

FOREIGN PATENT DOCUMENTS

JP   2000162607 A  *  6/2000

* cited by examiner

*Primary Examiner*—K. Cyrus Kianni
(74) *Attorney, Agent, or Firm*—Morris, Manning & Martin LLP; Tim Tingkang Xia

(57) ABSTRACT

A liquid crystal display includes a liquid crystal provided between a first layer and a second layer. The first layer and the second layer may be in a substantially parallel direction to each another. Spacers may be provided in the liquid crystal to keep the first layer and the second layer spaced apart from each other. Electrode layers may include structural elements operable to prevent the spacers from moving through the liquid crystal in the substantially parallel direction. The display may include a first electrode layer and a second electrode layer having one or more gaps defining an electrode structure including electrodes to control the display.

14 Claims, 3 Drawing Sheets

METHOD AND SYSTEM FOR A LIQUID CRYSTAL DISPLAY

BACKGROUND OF THE INVENTION

1. Field of the Invention

The present invention relates to LCD display technologies.

2. Related Art

Liquid crystal displays (LCD displays) are known in the field. An exemplary LCD display includes a number of pixel elements, usually arranged in a matrix formation, where each pixel element may be controlled individually to either emit or not emit light. By selectively controlling each pixel, a moving image may be created.

The LCD display may be formed by a liquid crystal provided in between two layers, where each layer may be formed by a plurality of sublayers. One of these sublayers is formed by liquid crystal elements that may be controlled by electrode layers (Indium Tin Oxide layer or ITO layer) arranged to address specific regions (pixels) of the liquid crystal element by applying a voltage to these specific regions. By applying a voltage (possibly zero volts) the orientation of the molecules of the liquid crystal may be controlled in such a way that the liquid crystal element may be in either an opaque state or a transparent state or in one or more semi-transparent states.

The liquid crystal and the electrodes are positioned in between two polarizing filters. Light travelling through the stack of liquid crystal display may be blocked or let through depending on the orientation of the liquid crystal molecules (depending on the voltage applied to the liquid crystal) of each pixel and the orientation of the polarizing filters.

In an example, the polarizing filters are positioned with their polarizing directions perpendicular with respect to each other. The liquid crystal is positioned in between two ITO layers. The ITO layers form electrodes to address pixels and apply a desired voltage to the liquid crystal.

The ITO layer comprises a liquid crystal alignment sublayer, for instance a sublayer of polyimide, facing the liquid crystal, treated to align the liquid crystal molecules in a certain direction. This treatment may be applied by rubbing (a cloth made of cotton) in a certain direction. The direction of alignment of the crystal molecules is defined by the direction of rubbing, which corresponds to the polarizing directions of the polarizing filters. The rubbing action may leave certain lines.

In case no voltage is applied to a given pixel, the molecules will align with the rubbing lines, and will therefore be arranged in a helical structure, or twist. Light passing through the first polarizing filter is rotated by this helical structure as it passes through the liquid crystal, allowing it to pass through the second polarizing filter.

However, once a voltage is applied to a certain pixel, with the electrical field lines running from one electrode sublayer to the other electrode sublayer, the helical structure will be disturbed under influence of the electrical field lines. As a result, no light can pass through this pixel as it is blocked by the second polarizing filter. This is also referred to as a 'normally not black' LCD display.

It will be understood that many variations to this example are possible and put to practise. For instance, by choosing a different relative orientation of the polarizing filters a 'normally black' LCD display DI may be created, meaning a LCD display in which pixels appear substantially black when no voltage is applied.

In order to create a color LCD display, each pixel may be divided into sub-pixels that may individually be addressed. Each pixel may be divided according to the RGB-arrangement, such that each pixel may be divided in a red, a green and a blue sub-pixel, as will be known to a skilled person. The colors are added to the arrangement by adding a separate color filter sublayer, for instance somewhere in between the polarizing sublayers. The color filter sublayer may be a matrix of adjacent color filters.

LCD displays are also used in so-called double layer super twisted nematic (DSTN) displays, in which a compensating sublayer is provided in addition to a LCD display, to provide a sharper image. The compensating sublayer is formed by an LCD display, without pixels formed therein, and is referred to as a passive LCD display (also known as compensator cell in DSTN displays). Therefore, the ITO layers of such a passive LCD display are unstructured, in contrast to a 'normal' LCD display, also referred to as the active LCD display. The passive LCD display may also be regarded as an LCD display with only one pixel.

For both the active and the passive LCD displays, the liquid crystal is captured in between two ITO layers. Spacers are provided in between the two ITO layers to keep the ITO layers at a predetermined distance with respect to each other. The spacers are formed by a plurality of grains or powder, such as a plurality of spheres or substantially round elements having a diameter of e.g. 4-6 μm.

However, it is observed that the spacers may move through the display, for example, under the influence of vibrations. Vibrations may occur during an ultrasonic cleaning process during manufacturing, where the frequency of the ultrasonic bath can cause moving spacers, or during the actual use of the LCD display. For instance in application in the automotive industry, vibrations may be caused by the engine of a car.

In the known designs, the barriers that limit the movements are the rubbing lines and gaps provided in the ITO layer. This may lead to clustering of spacers along the barriers. Clustered spacers may result in visible lines in the LCD display, disturbing the view of an observer. The yield figures from the production of LCD's show that visible clustering of spacers provide a significant contribution to the reject rate, especially in DSTN-displays for automotive applications. Therefore, it is desirable to provide an LCD display that is less sensitive for moving spacers.

SUMMARY OF THE INVENTION

Exemplary embodiments of the disclosed embodiments provide a system and method for a liquid crystal display. The display may include a liquid crystal provided between a first layer and a second layer. The first layer and the second layer may be in a substantially parallel direction to each another. Spacers may be provided in the liquid crystal to keep the first layer and the second layer spaced apart from each other. Electrode layers including structural elements may be operable to prevent the spacers from moving through the liquid crystal in the substantially parallel direction.

The display may have a first electrode layer and a second electrode layer that further includes gaps defining an electrode structure including electrodes to control the display. The display may include a passive liquid crystal display wherein the gaps define display cells. The structural elements may have a length substantially lesser than that of the display cells.

In an embodiment, the display is an active liquid crystal display and the gaps defining the electrodes are used to address pixels. The structural elements may have a length substantially lesser than that of a pixel.

In an embodiment, the structural elements do not change the electrode structure. In an embodiment, the structural elements are formed by one or more elongated trenches. The trenches may have a width substantially lesser than a diameter of a spacer.

In an embodiment, the spacers may be formed by a plurality of substantially round elements. One or more of the spacers have a diameter of 4 to 6 micrometers.

In an embodiment, the structural elements are provided in one of: a randomized format; and a quasi randomized format.

In an embodiment, any one of the first layer and the second layer of the display further includes a liquid crystal alignment sublayer that includes rubbing lines, where the structural elements are provided at an angle with respect to the rubbing lines.

In an embodiment, the display includes a double layer super twisted nematic (DSTN) display, and further includes any one or both of: an active liquid crystal display; and a passive liquid crystal display.

In yet another embodiment, a method of manufacturing the aforementioned liquid crystal display is provided. The method may include: providing a substantially flat Indium Tin Oxide (ITO) layer; providing a mask with a pattern; creating one or more gaps defining one or more electrode structures operable to control the display using photolithographic techniques, including projecting the pattern to the ITO layer and developing the ITO layer, where the pattern further comprises the structural elements.

In yet another embodiment, a system is provided. The system includes a memory system; one or more a processors logically connected with the memory system; one or more input devices operable to input information into the memory via function of the processors; and one or more output devices operable to output information from the memory via function of the processors. The output device may be any one of the aforementioned liquid crystal display devices.

Further objectives and advantages, as well as the structure and function of preferred embodiments, will become apparent from a consideration of the description, drawings and examples.

BRIEF DESCRIPTION OF THE DRAWINGS

The foregoing and other features and advantages of the disclosed embodiments will be apparent from the following, more particular description, as illustrated in the accompanying drawings wherein like reference designations generally indicate identical, functionally similar, and/or structurally similar elements.

FIG. 5b is a schematic illustration of a cross-sectional view of FIG. 5a; and

DETAILED DESCRIPTION OF THE PREFERRED EMBODIMENTS

Figure 1:
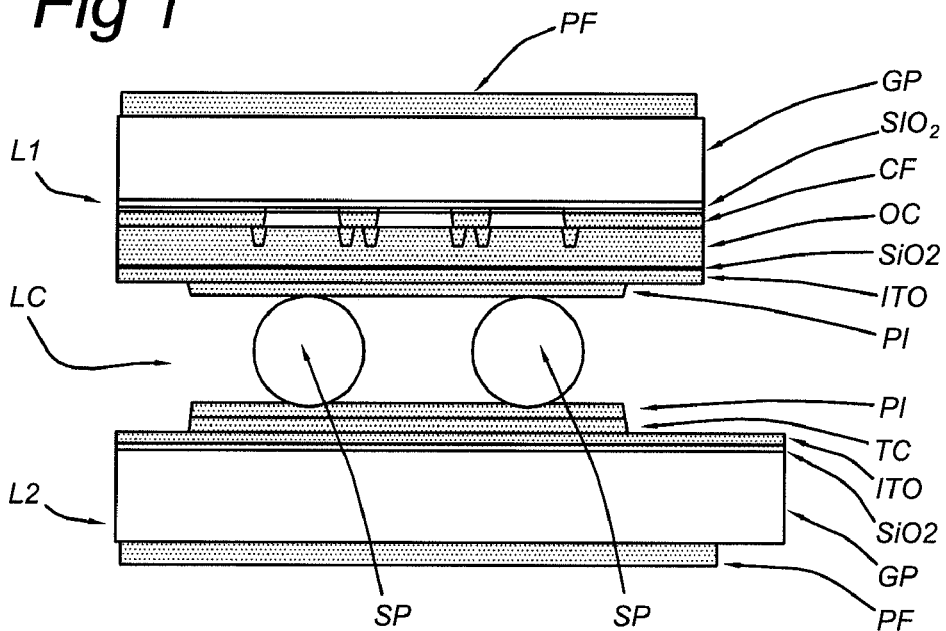
FIG. 1 is a schematic illustration of a cross-sectional view of a LCD display.

For one or more embodiments, FIG. 1 provides a schematic illustration of a cross-sectional view of an LCD display. As can be seen in FIG. 1, the LCD display comprises a liquid crystal LC provided in between a first layer (L1) and a second layer (L2). In certain embodiments, the first and second layer (L1, L2) are substantially parallel with respect to each other. The first and second layer (L1, L2) each comprise a glass plate GP, positioned substantially parallel with respect to each other. Both glass plates GP have a polarizer filter PF at the outside. As described above, the polarizing directions of the polarizer filters PF may be substantially parallel or substantially perpendicular with respect to each other, depending on the type of LCD display.

At the surface of each glass plate GP facing the other glass plate GP, an $SiO_2$ sublayer is provided, forming an Na+ barrier, to avoid pollution of the LC by the Na ions of the glass.

On top of the SiO2 sublayers, Indium Tin Oxide layer or layers (referred to hereinafter as ITO or ITO layer) may be formed. The ITO layer form the electrodes used to address the pixels and to provide a desired voltage to the pixels. In the exemplary embodiment of a passive LCD display, the ITO layer may be continuous (uninterrupted) sublayers forming display cells (having dimensions corresponding, for example, to 300×400 pixels), used to apply a voltage to the entire passive LCD display. The display cells may be separated by a gap GA (labeled in other figures) in the ITO layer. Although in the exemplary embodiment, term ITO or ITO layer is used, it will be understood that the term may include or encompass any electrode layer.

As described above, a color filter sublayer CF may be provided, somewhere in between the polarizing sublayers on top of the ITO layer. The color filter sublayer CF may be a matrix of adjacent color filters. The color filter sublayer CF may further include an overcoat sublayer OC.

Figure 2A:
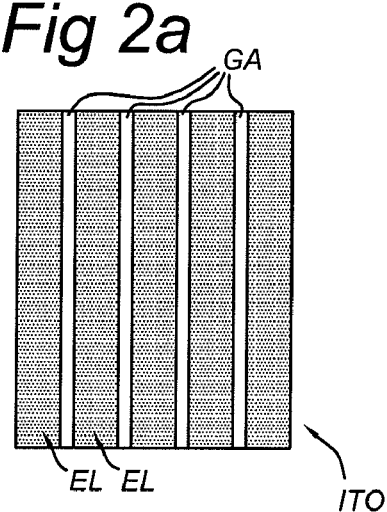
FIGS. 2a, 2b and 2c are schematic illustrations of a top view of an ITO layer.
Figure 2B:
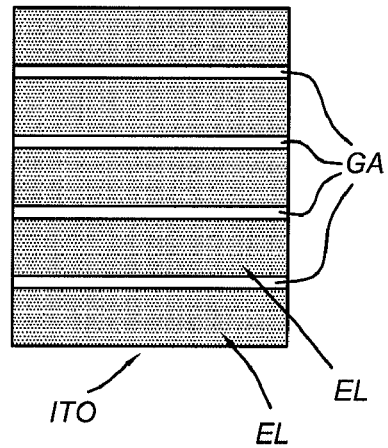

In an active LCD display, the ITO layer may, for example, be formed by a plurality of substantially parallel electrodes EL (shown in FIGS. 2a, 2b), where the electrodes EL in a first ITO layer (see FIG. 2a) may be strips substantially perpendicular with respect to similar electrodes EL in a second ITO layer (see FIG. 2b). The strips or electrodes EL are separated from each other by gaps GA.

Figure 2C:
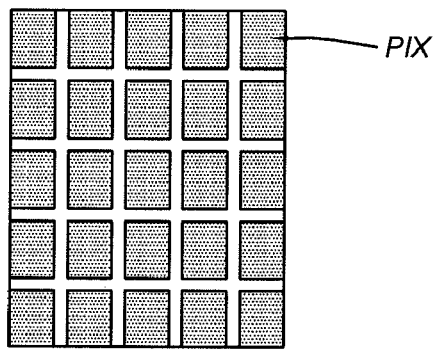

When positioned on top of each other (enclosing liquid crystal LC) the electrodes EL may be used to address one selected pixel (see FIG. 2c).

Based on the above it will be understood that the ITO layer in both the passive and the active LCD display may comprise gaps GA. In the passive LCD display the gaps GA may be provided to separate and/or different display cells, being the size of a plurality of pixels. In the active LCD display the gaps GA may be provided to define the pixels.

Further provided in the illustrated embodiments is a polyimide sublayer PI, separated from the ITO layer by a top coat sublayer TC. The poly-imide sublayer PI may be treated to align the liquid crystal molecules in a certain direction. This treatment may be applied by rubbing a cloth in a certain direction. The direction of alignment of the crystal molecules is defined by the direction of rubbing. The rubbing may leave rubbing lines (not shown). Both the top coat sublayer TC and the poly-imide sublayer PI "follow" the contour of the gaps in the ITO layer.

Figure 3:
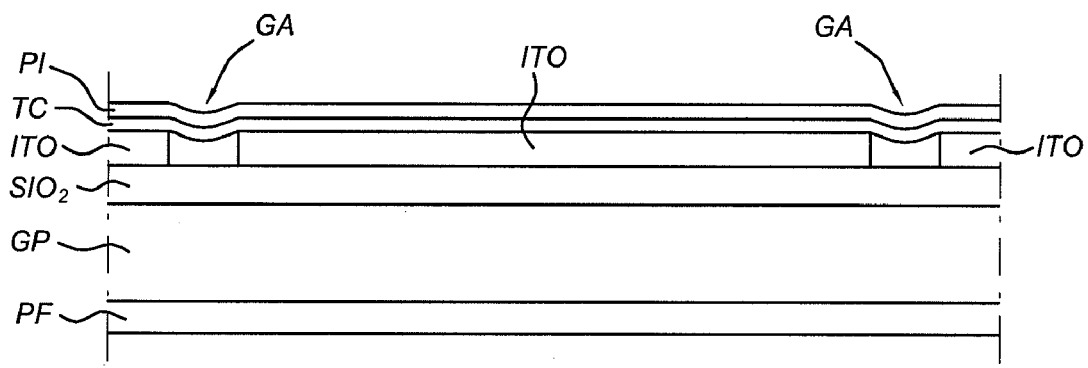
FIG. 3 are schematic illustrations of a cross-sectional view of part of an LCD display.

FIG. 3 schematically depicts a cross-sectional view of part of an LCD display in an embodiment, showing two gaps GA in the ITO layer. As can be seen in FIG. 3, the top coat sublayer TC and the poly-imide sublayer PI may follow the gaps GA in the ITO layer.

As explained above, in certain exemplary LCD display designs, a high concentration of spacers SP may be present along the ITO tracks and rubbing lines. For active as well as passive LCD displays, the PI-sublayer may be rubbed to orientate the LC. The spacers SP may therefore cluster along the rubbing lines and/or the gaps GA. However, it will be understood that for active LCD displays the gaps GA in the ITO layer may be more important for clustering than for passive LCD displays.

Figure 4:
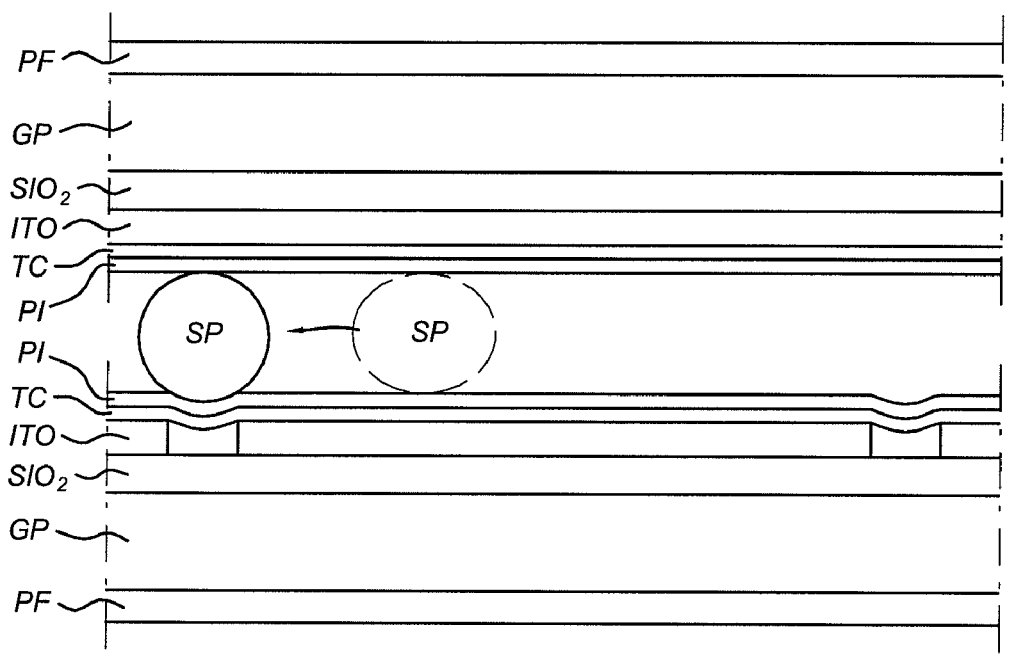
FIG. 4 is a schematic illustration of a cross-sectional view of a LCD display comprising a spacer.

FIG. 4 illustrates an exemplary cross-sectional view of an LCD display. The view illustrates a spacer SP that has moved from a first initial position (dashed lines) to a second position, where the spacer SP is trapped in the gap GA.

As provided below, certain embodiments are described that reduce the visible clustering of spacers SP. The clustering of spacers SP may be merely nearly visible or not at all visible for an average user as structural lines if the amount of spacers SP per clustering is relatively small.

First Exemplary Embodiment

The following sets forth a first set of exemplary embodiments. In a passive LCD display, the ITO layer may not include gaps (only to define the display cells), and the spacers SP may easily move through the whole display cell of the LCD display.

As explained above, the spacers SP may have the tendency to form lines along the rubbing lines, because the rubbing lines are the only obstacles limiting the movement of the spacers SP.

According to these embodiments, a kind of "randomization" may be created by adding a structure in the ITO layer. This structure in the ITO layer may act in the same or comparable way as the rubbing lines, such as resistance lines for the spacers SP. By a careful choice of the structure in the ITO layer, visible clustering of the spacers SP may be prevented or reduced.

Figure 5A:
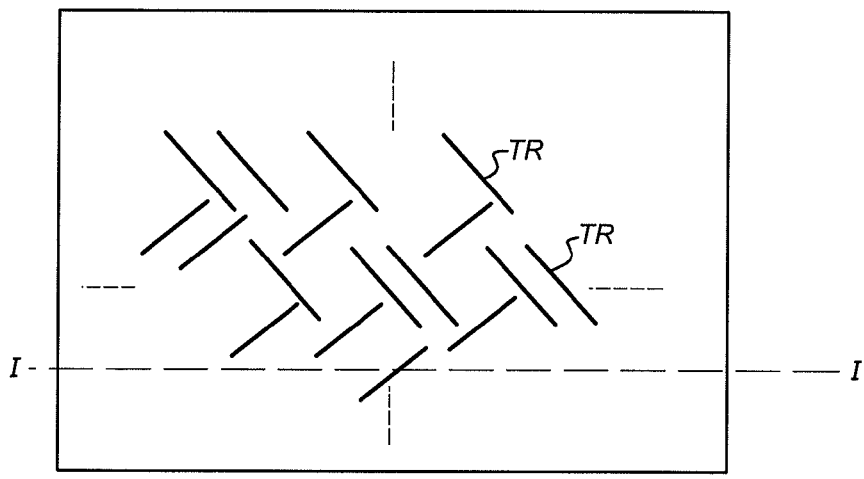
FIG. 5a is a schematic illustration of a top view of an ITO layer of an LCD display according to an embodiment.

FIG. 5a schematically illustrates a top-view of an ITO layer of a display cell according to one such embodiment. The ITO layer may be provided with a structure, for instance formed by a plurality of structural elements, such as trenches TR, as shown in FIG. 5a.

Figure 5B:
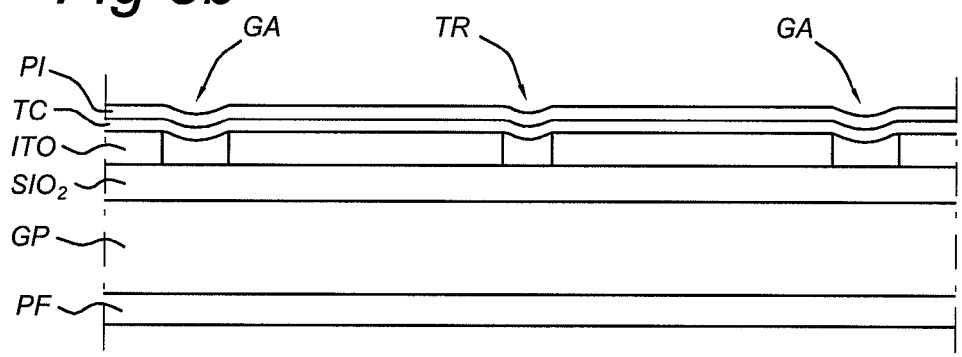

FIG. 5b schematically illustrates a cross sectional side view showing how one trench TR may be followed by a top coat sublayer TC and the poly-imide sublayer PI.

The trenches TR may be arranged in such a way, that the ITO layer does not comprise isolated parts (for example, "island" structures, not in direct electrical contact with other parts of the ITO layer), so that a voltage can still easily be applied to the whole ITO layer. In case the trenches TR are arranged in such a way that parts of the ITO layer become isolated from other parts, additional hardware (such as additional electric contacts) may be provided to address the whole ITO layer, in order, for example, to provide a voltage to all parts of the ITO layer.

The trenches TR may have a width that is chosen based on the diameter of the spacers SP. The trenches TR may be chosen smaller than the diameter of the spacers SP. According to one exemplary embodiment, the trenches TR may have a width of approximately 3.4 μm.

The trenches TR may have a length that is chosen based on the function and/or quality requirements of the LCD display and the size of the panel. For example, the length of the trenches may be chosen such that a cluster of spacers SP along a trench TR will not result in a visible line. According to an exemplary embodiment, the trenches TR may have a maximum length of approximately 50 μm.

It will be understood that also other types of structural elements may be provided as well. One example is elongated ridges. The structure may be formed by notches or protrusions or other means, or a combination of such structural elements.

The structural elements may have an elongated shape, which is short enough to prevent visible clustering of spacers SP. Of course, the definition of visible may depend on the type of display and/or the circumstances of its usage, such as a laptop-screen, a mobile phone screen or information screen in a public location, such as a railway station.

The elongated shape of the structural elements may be positioned at a particular angle with respect to the rubbing lines, for instance an angle of approximately 45°. It will be understood that in case the structural elements are substantially parallel to the rubbing lines, the structural elements may not have much effect. In an exemplary embodiment, if the structural elements are provided under an angle with respect to the rubbing lines, the structural elements may hold onto or "catch" spacers SP from different rubbing lines.

The spacers SP may be limited in their freedom of movement and may accumulate along the structural elements. The dimensions of the structural elements may be short enough to prevent visible clustering of spacers that can disturb the overall display cell performance.

In exemplary embodiments, the poly-imide sublayer PI is a continuous sublayer and is applied on top of the ITO layer, similarly to the top coat sublayer TC. For example, the rubbing lines may be "scratches" in the poly-imide sublayer PI. When providing the ITO layer with a structure as explained above, the poly-imide sublayer PI may follow the structure of the ITO layer, as shown and described with respect to FIG. 5b.

The structural elements may be provided in a randomized or quasi randomized way. For example, the structural elements may be provided such that no easily or very visible cluster lines of spacers SP occur, which may again result in visible clustering of spacers SP. Therefore, the structural elements may be provided in a non-symmetric way, or the structural elements may be provided in a non-repetitive pattern. It will be understood that the term randomized or quasi-randomized as used here need not suggest that the creation of structural elements TR are the result of an uncontrolled process, in which it is unsure where structural elements TR are created.

According to an exemplary embodiment, both ITO layers may be provided with structural elements. If both ITO layers are provided with structural elements, the structural elements of the both ITO layers may designed to correspond with each other, or may be designed to not correspond with each other, as the case may be. In this exemplary embodiment, structural elements of two ITO layers are considered corresponding if the structural elements of one ITO layer are substantially facing the structural elements of the other ITO layer when assembled.

In case the structural elements are trenches, the structural elements may be chosen as non-corresponding, to prevent creation of too big a distance between the respective ITO layers. In case corresponding structural elements are provided, the depth of the trenches TR may be chosen carefully, to prevent creating too big a distance between the ITO layers ITO.

As illustrated in the foregoing figures, in addition just a single ITO layer may also be provided with structural elements.

Second Exemplary Embodiments

The following sets forth a second set of exemplary embodiments. In an active LCD display, the ITO layers may comprise gaps GA corresponding to the pixels, as shown in more detail in FIGS. 2a, 2b and 2c and as described above.

As explained above, the spacers SP may have the tendency to form lines along the gaps GA defining the pixels and the rubbing lines, because these obstacles limit the movement of the spacers SP.

According to an exemplary such embodiment, a structure is provided in the ITO layer within pixels. This structure in the ITO layer acts in the same way as the rubbing lines, for example, as resistance lines for the spacers SP. By a careful choice of the structure in the ITO layer, visible clustering of the spacers SP may be prevented or reduced.

Figure 6:
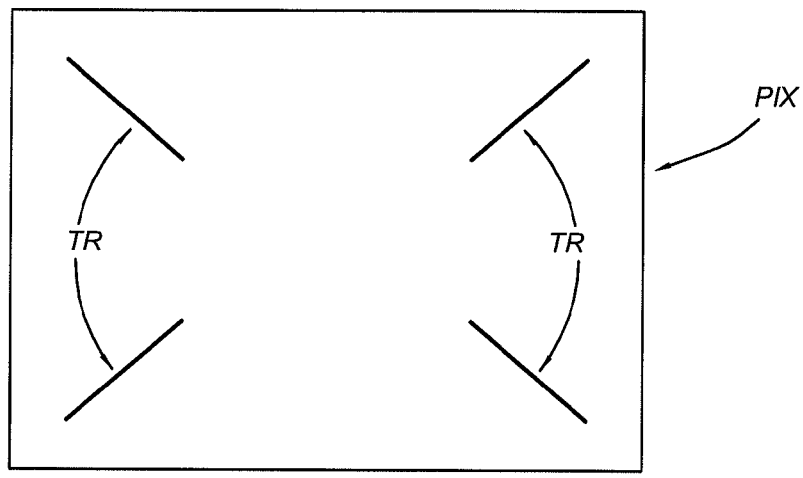
FIG. 6 is a schematic illustration of a top view of an ITO layer according to a further embodiment.

FIG. 6 schematically illustrates a top-view of an ITO layer of a pixel PIX according to an exemplary embodiment. The ITO layer is provided with a structure, for instance formed by a plurality of structural elements, such as trenches TR as shown in FIG. 6. It will be understood that the trenches TR according to this embodiment result in a similar cross-sectional view as shown in FIG. 5b.

According to this example, four trenches TR are provided in the ITO layer. In an exemplary such embodiment, the trenches TR may have a width of 3.4 μm and may have a length smaller than the length of the pixel PIX, for example, smaller than half the length of the pixel PIX.

As explained above, also other types of structural elements may be provided, such as elongated ridges. The structure may be formed by notches or protrusions, or a combination of such structure.

The structural elements may have an elongated shape, which is short enough to prevent visible clustering of spacers SP. Of course, the definition of visible may depend on the type of display and/or the circumstances of its usage, such as a laptop-screen, information screen in a public location, such as a railway station.

The elongated shape of the structural elements may be positioned with an angle with respect to the rubbing lines, for instance an angle of approximately 45°, similar as explained with reference to the foregoing first embodiments.

The spacers SP may in this way be limited in their freedom of movement and can cluster along the trenches TR, without disturbing the performance.

Similar to above, the trenches TR may be arranged in such a way, that the ITO layer of a pixel PIX does not include isolated parts (for example, "island" structures, not in direct electrical contact with other parts of the ITO layer), so a voltage can still easily be applied to the whole ITO layer of that pixel PIX.

Third Exemplary Embodiments

The following sets forth a third set of exemplary embodiments. According to these embodiments, there may be provided a method of manufacturing a LCD display or parts of it, to create at least one of the embodiments, or parts of it, as described above.

The structural elements as described in the above noted embodiments may be formed during manufacturing of the LCD display in a same or similar manufacturing step as in which the gaps GA are created.

According to an exemplary such method, a flat ITO layer is provided. A pattern is projected on this ITO layer using photolithographic techniques, possibly using a proximity method. Other methods known to skilled persons may be used as well.

In a next step the ITO layer may be developed into a patterned ITO layer. The pattern creating the structural elements (for example, trenches TR) may be added as an additional pattern to the masks or reticles that are used to create the gaps GA. According to one such exemplary embodiment, no additional masks or reticles are needed and no additional processing actions are needed. The trenches TR may be, for example, as deep as the ITO layer itself.

According to an alternative, the reticle or mask may be provided with a grey scale. Such a grey scale may be used to provide trenches (TR) having a depth that do not extend through the whole depth that may be used.

CONCLUSION

The above noted embodiments describe may be useful in active LCD displays as well as in passive LCD displays.

Certain embodiments describe to add a structure to the ITO layer of an LCD display to limit the movement of the spacers SP and preduce free floating of the spacers SP. In exemplary embodiments, the structure may be formed in such a way, that visible clustering of the spacers SP is prevented. This may be done, for example, by choosing the structural elements to be small enough, depending on the circumstances of usage and other paramaters, and/or providing the structural elements in a non-symmetric or non repetive way. According to certain embodiments, structural elements may be added to certain gaps GA. In one or more embodiments, the structural elements may be provided as trenches TR, having a width that is smaller than the width of the gaps GA.

The trenches may be as deep as the ITO layer. In an exemplary case, the pattern of the trenches TR is to be chosen in such a way that the electrodes of the ITO layers ITO are not cut completely, such that no isolated parts of the electrodes are created, as isolated parts may be difficult to address. This may be done by providing structural elements that are substantially smaller than a display cell in a passive LCD display, or substantially smaller than the size of a pixel in an active LCD display.

In certain embodiments, the trenches may also be less deep than the ITO layer, preventing creation of isolated parts of the electrodes.

The embodiments illustrated and discussed in this specification are intended only to teach those skilled in the art the best way known to the inventors to make and use the invention. Nothing in this specification should be considered as limiting the scope of the present embodiments. All examples presented are representative and non-limiting. The above-described embodiments of the invention may be modified or varied, without departing from the invention, as appreciated by those skilled in the art in light of the above teachings. It is therefore to be understood that, without the scope of the claims and their equivalents, the invention may be practiced otherwise than as specifically described.

What is claimed is:

1. A liquid crystal display, comprising:
    a liquid crystal provided between a first layer and a second layer, the first layer and the second layer being in a substantially parallel direction to each another;
    one or more spacers being provided in the liquid crystal to keep the first layer and the second layer spaced apart from each other; and
    one or more electrode layers comprising one or more structural elements operable to prevent the spacers from moving through the liquid crystal in a said substantially parallel direction, wherein
    a first said electrode layer and a second said electrode layer further comprises one or more gaps defining an electrode structure comprising electrodes to control the display.

2. The display according to claim 1, wherein the display comprises a passive liquid crystal display wherein the gaps define one or more display cells.

3. The display according to claim 2, wherein the structural elements have a length substantially lesser than that of the display cells.

4. The display according to claim 2, wherein the display comprises a double layer super twisted nematic (DSTN) display, and further comprises any one or both of: an active liquid crystal display; and a passive liquid crystal display according to claim 2.

5. The display according to claim 1, wherein the display is an active liquid crystal display and wherein the gaps defining the electrodes are used to address pixels.

6. The display according to claim 5, wherein the structural elements have a length substantially lesser than that of a said pixel.

7. The display according to claim 5, wherein the display comprises a double layer super twisted nematic (DSTN) display, and further comprises any one or both of: an active liquid crystal display according to claim 5; and a passive liquid crystal display.

8. The display according to claim 1, wherein the structural elements do not change the electrode structure.

9. The display according to claim 1, wherein the structural elements are formed by one or more elongated trenches.

10. The display according to claim 9, wherein the trenches have a width substantially lesser than a diameter of a said spacer.

11. The display according to claim 1, wherein the spacers are formed by a plurality of substantially round elements.

12. The display according to claim 11, wherein one or more of the spacers have a diameter of 4 to 6 micrometers (μm).

13. The display according to claim 1, wherein the structural elements are provided in one of: a randomized format; and a quasi randomized format.

14. The display according to claim 1, wherein any one of the first layer and the second layer of the display further comprises a liquid crystal alignment sublayer comprising rubbing lines, and wherein the structural elements are provided at an angle with respect to said rubbing lines.

* * * * *